United States Patent
Alexeev et al.

[11] Patent Number: 5,961,381
[45] Date of Patent: Oct. 5, 1999

[54] APPARATUS FOR COOLING A PLUNGE GRINDING DRUM

[75] Inventors: Nikolai M. Alexeev, Rochester; Stephen J. Rookey, West Henrietta, both of N.Y.

[73] Assignee: Enbi Rochester, Inc., West Henrietta, N.Y.

[21] Appl. No.: 09/088,181

[22] Filed: Jun. 1, 1998

Related U.S. Application Data

[60] Provisional application No. 60/047,368, Jun. 2, 1997.

[51] Int. Cl.⁶ .................................................. B24B 3/00
[52] U.S. Cl. ............................................... 451/488
[58] Field of Search .................... 451/541, 547, 451/488; 492/46, 43, 44

[56] References Cited

U.S. PATENT DOCUMENTS 3,603,045  9/1971  Mighton ..................................... 51/170
4,991,276  2/1991  Briemont .................................... 29/124

Primary Examiner—David A. Scherbel
Assistant Examiner—Shantese McDonald
Attorney, Agent, or Firm—Harris Beach & Wilcox, LLP.

[57] ABSTRACT

Apparatus is provided for reducing the temperature of a plunge grinding drum to minimize the effects of thermal expansion on the accuracy of the grinding process. The grinding drum has air passages through the interior of the grinding drum. A radiator cylinder is pressed into the inside of the drum. The radiator cylinder has an outside diameter sized so that it can be press fit into the drum. The radiator cylinder has a plurality of radial fins projecting inward. Air is conducted through the grinding drum and picks up heat from the radiator fins. The air then carries the heat out of the grinding drum. The grinding drum has a shaft with a hollow central region for receiving air. The grinding drum has flanges on each end which have openings to allow the air to flow into and out of the grinding drum. At the air inlet, the opening in the flange is preferably at the flange's center. At the air outlet, the openings in the flange are preferably adjacent the radiator fins. Compressed air is injected into the drum at approximately 5 to 10 psi. The air flows from the center of the drum through radial passages in the inlet flange to the axial passages created between the radiator fins. When this occurs, heat is removed from the drum to limit the drum's temperature and as follows the thermal expansion.

9 Claims, 3 Drawing Sheets

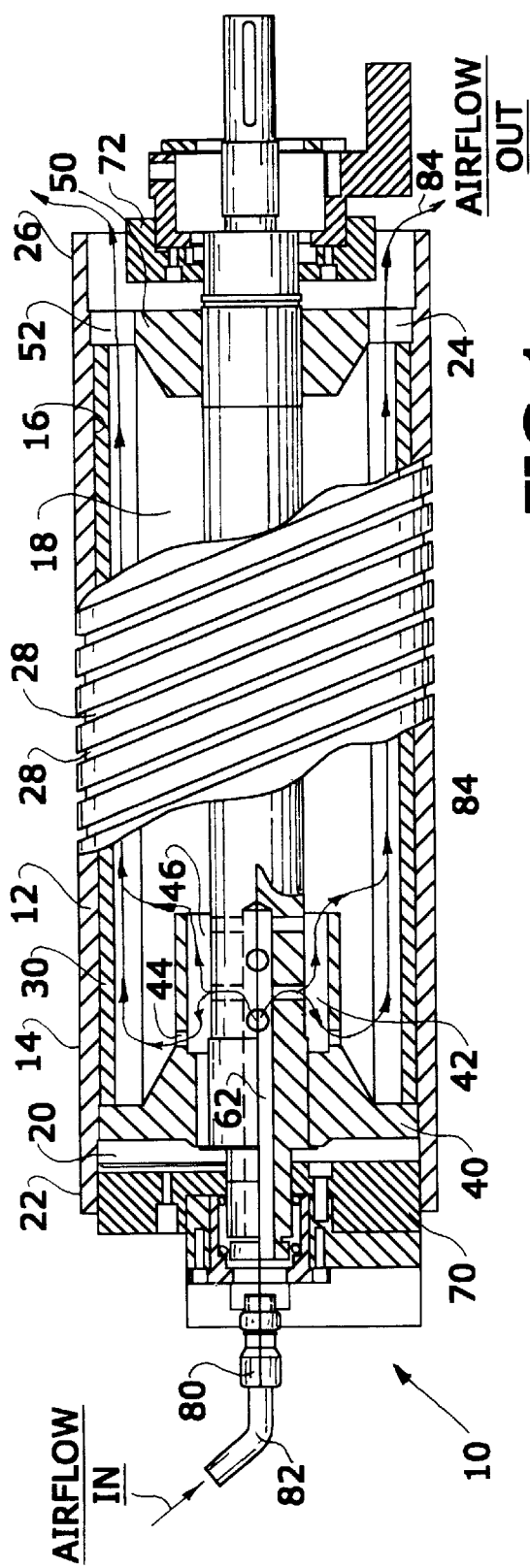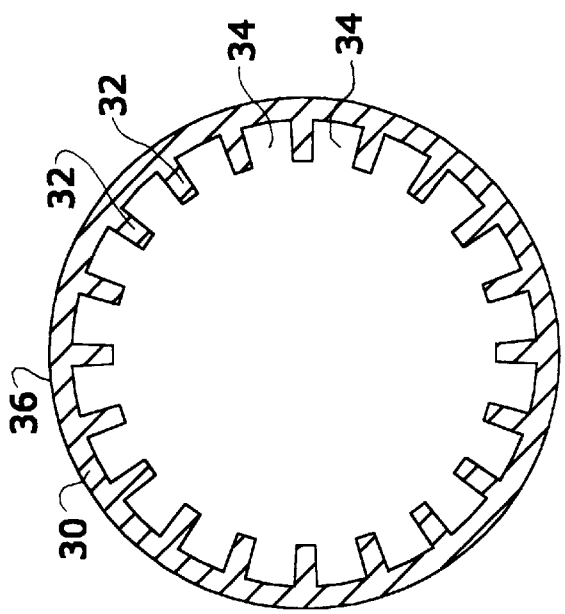

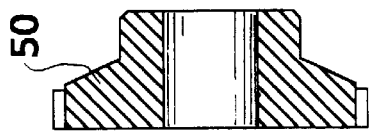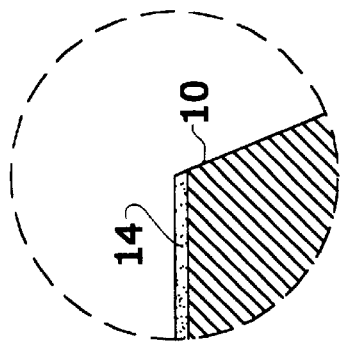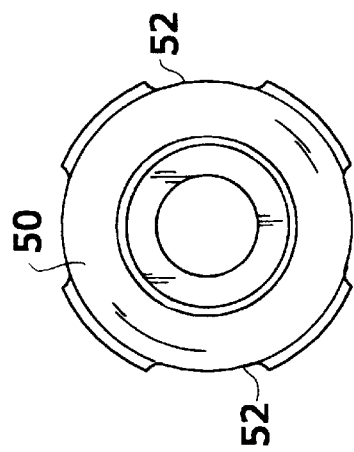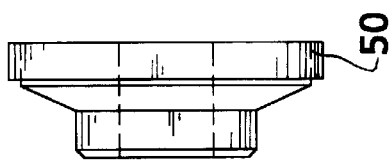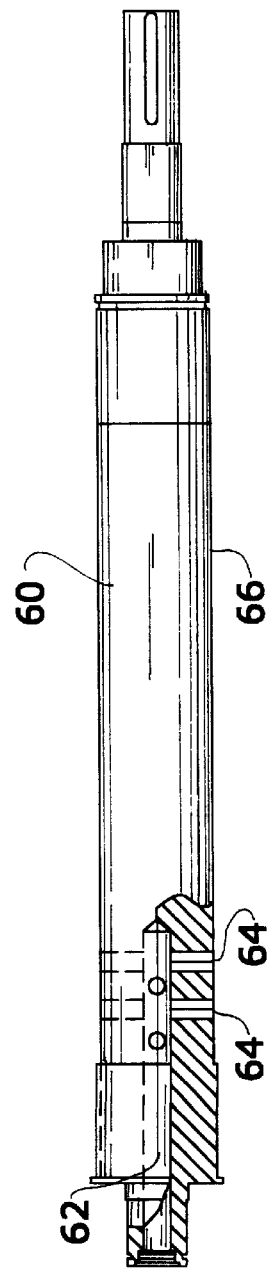

APPARATUS FOR COOLING A PLUNGE GRINDING DRUM

This application claims priority from Provisional Application number 60/047,368 filed Jun. 2, 1997.

BACKGROUND OF THE INVENTION

The present invention relates to an apparatus for cooling the grinding drum of a device for machining resilient materials.

Two machining techniques based on grinding drums are known: traversing and plunge grinding. In the traversing technique, a grinding drum moves across the workpiece (i.e. traverses) for a length of time such as 40–50 seconds. In the plunge grinding technique, a grinding drum having a width which is at least equal to the length of the workpiece is moved in toward the workpiece and contacts the workpiece for approximately 4 seconds. In the plunge grinding technique, diamond coated grinding drums have recently been used. While these diamond coated grinding drums can quickly and efficiently grind the resilient surface of the workpiece, the grinding drum is susceptible to thermal expansion which can affect the accuracy of the grinding process.

SUMMARY OF THE INVENTION

An apparatus is needed which will reduce temperature of a plunge grinding drum to minimize the effects of thermal expansion on the accuracy of the grinding process. The grinding drum is usually cylindrical, but could have a contoured outer surface as is known in the art. The grinding drum is preferably constructed of steel and has fluid passages through the interior of the grinding drum. A radiator cylinder, preferably made of aluminum, is pressed into the inside of the drum. The radiator cylinder has an outside diameter sized so that it can be press fit into the drum. The radiator cylinder has a plurality of radial fins projecting inward. Fluid, preferably compressed air, is conducted through the grinding drum and picks up heat from the radiator fins. The fluid then carries the heat out of the grinding drum. The grinding drum has flanges on each end, one of them (outlet flange) has openings to allow the fluid to flow out of the grinding drum. At the air outlet, the openings in the flange are preferably adjacent the radiator fins. The inlet flange has a cylindrical screen with ports which screens the inner surface of the drum with jets of air.

A shaft is provided with a hollow central region which has fluid passages in communication with the center of the inlet flange. The fluid passages of the shaft extend radially from the hollow central portion to the outer diameter of the shaft. Bearing blocks are provided at each end to rotatably support the shaft. The bearing block at the inlet side has an opening at its center to allow fluid to pass through the bearing block.

Compressed air or other fluid is injected into the drum at less than 25 psi, preferably at approximately 5 to 10 psi. A chiller can be used to reduce the temperature of the compressed fluid. The fluid flows from the hollow center portion of the shaft, through the fluid passages in the shaft. After exiting the shaft, the fluid flows through radial passages in the inlet flange and the annular port in the inlet flange to the axial passages created between the radiator fins. The fluid exits through openings in the outlet flange. When this occurs, heat is removed from the drum to reduce the drum's thermal expansion.

The operating temperature of a uncooled grinding drum would be on the order of 115° F. and would vary by 30–40° F. With the cooling of the present invention, the operating temperature would be on the order of 75–85° F. (if cooled by air with 70–75° F.).

BRIEF DESCRIPTION OF THE DRAWINGS

For a fuller understanding of the nature and objects of the invention, reference should be made to the following detailed description of a preferred mode of practicing the invention, read in connection with the accompanying drawings, in which:

FIG. 1 is a cross sectional view of the grinding drum of the present invention;

FIG. 2 is a cross sectional view of the radiator of the present invention;

FIG. 7 is a side view of the outlet flange of the present invention;

FIG. 8 is a front view of the outlet flange of FIG. 7;

FIG. 9 is a cross sectional view of the outlet flange of FIG. 7;

FIG. 10 is a partial cut away view of the shaft of the present invention; and

FIG. 11 is a view of the surface of the drum of the present invention showing the diamond coated surface.

DETAILED DESCRIPTION OF THE INVENTION

Figure 5:
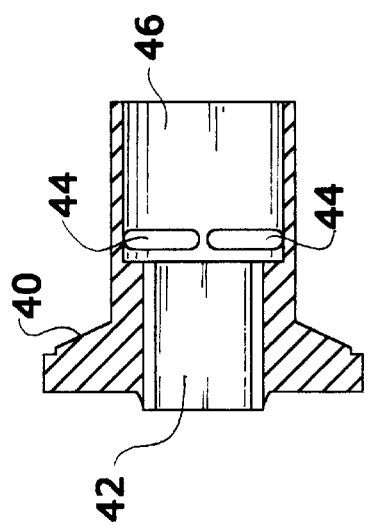
FIG. 5 is a cross sectional view of the inlet flange of FIG. 3.

FIG. 1 illustrates the grinding drum 10 of the present invention. The drum 10 has an outer cylindrical surface 12. The surface is preferably coated with a diamond layer 14 (FIG. 11). The drum 10 has an inside cylindrical surface 16 and a hollow interior 18. The drum 10 has a first opening 20 at its first end 22 and a second opening 24 at its second end 26. Preferably, the drum 10 has a plurality of helical grooves 28 cut into its surface 12.

A cylindrical radiator 30 is disposed within the drum 10. The radiator has an outside diameter 36 such that it contacts the inside cylindrical surface 16 of the drum 10. Preferably, there is an interference fit between the drum 10 and radiator 30 of between 1 and 3 thousandths of an inch. As shown in FIG. 2, the radiator 30 has a plurality of fins 32 disposed circumferentially around the radiator 30 and projecting radially inward. The fins 32 define axial fluid passages 34.

Figure 4:
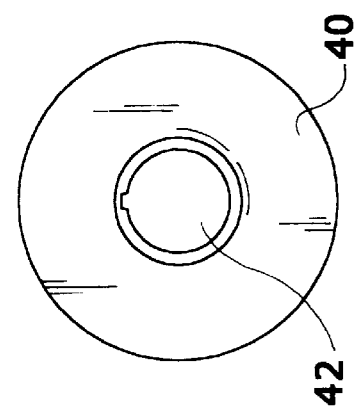
FIG. 4 is a front view of the inlet flange of FIG. 3.
Figure 6:
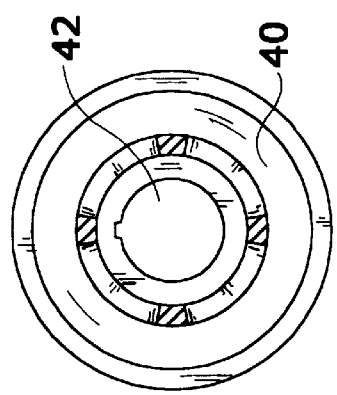
FIG. 6 is a rear view of the inlet flange of FIG. 3.
Figure 3:
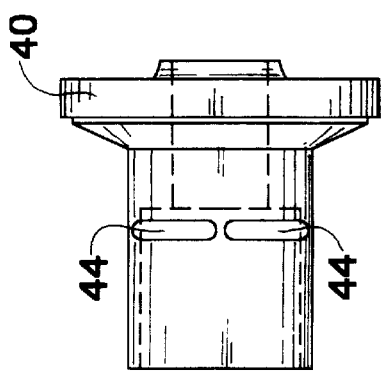
FIG. 3 is a side view of the inlet flange of the present invention.

An inlet flange 40, shown in FIGS. 3–6, is disposed in the first opening 20. The inlet flange 40 has a central passageway 42, radial outlet ports 44 and an annular outlet port 46. The air jets which come from the nozzles 64 are broken by the flange 40. This converts air jets into the fairly even air flow and contributes for maintenance a consistent temperature through the entire length of the drum. An outlet flange 50 (FIGS. 7–9) is disposed in the second opening 24. The outlet flange 50 has radial slots 52.

As shown in FIGS. 1 and 10, a shaft 60 is disposed within the center of the drum 10. The shaft 60 has a hollow central region 62. The hollow central region 62 is in communication with radial ports 64 in the shaft 60. Radial ports 64 terminate at the outer surface 66 of shaft 60. When the drum 10 and flanges 40 and 50 are assembled around the shaft 60, the shaft 60 will allow the drum 10 to be rotated. Bearing blocks 70 and 72 (FIG. 1) are provided to support the shaft 60 to allow for rotation of the drum 10.

A nozzle 80 (FIG. 1) is connected to a fluid conduit 82. The fluid conduit carries fluid, such as compressed air, to the nozzle 80. The nozzle 80 is disposed adjacent the hollow central region 62. The nozzle 80 directs fluid represented by the arrows 84 through the hollow central region 62. The fluid exits radial ports 62 and enters the central passageway 42 of the flange 40. The fluid 84 flows through the outlet ports 44 and the annular outlet port 46 and into the axial passages 34. In the axial passages 34, the fluid 84 absorbs thermal energy from the fins 32. The fluid 84 exits out of the radial slots 52.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A fluid cooled grinding apparatus comprising:

a grinding drum having an outside and inside diameter, a first opening at one end and a second opening at the other end and a hollow interior;

a radiator disposed within said drum, having an outside diameter sized to fit within the inside diameter of said drum in a close fitting relationship to said drum, said radiator having a plurality of fins defining fluid passages therebetween;

means for rotating said drum; and means for injecting fluid through said fluid passages such that said fluid removes thermal energy from said drum.

2. The apparatus of claim 1 further including a diamond layer attached to said outer diameter of said drum.

3. The apparatus of claim 1 further including inlet and outlet flanges, said inlet flange disposed within said first opening and having a central passage therethrough and said outlet flange disposed within said second opening and having radial passages therethrough such that said fluid can be injected through said inlet flange, flow past said fins and flow out through said outlet flange.

4. The apparatus of claim 3 wherein said means for injecting fluid comprises a fluid conduit and nozzle disposed adjacent said central passage.

5. The apparatus of claim 1 wherein said plurality of fins are spaced circumferentially about said radiator and project radially inward.

6. The apparatus of claim 1 wherein said fluid comprises compressed air at less than 25 psi.

7. The apparatus of claim 1 wherein said fluid comprises compressed air at between 2 and 20 psi.

8. The apparatus of claim 1 wherein said fluid comprises compressed air at between 8 to 10 psi.

9. The apparatus of claim 3 wherein said means for rotating said drum includes a shaft and a pair of bearing blocks, said inlet and outlet flanges mounted to said shaft and said shaft rotatably mounted within said pair of bearing blocks.

* * * * *